United States Patent

[11] 3,624,007

| [72] | Inventor | Edward Meyer |
| | | Russell, Pa. |
| [21] | Appl. No. | 1,261 |
| [22] | Filed | Jan. 7, 1970 |
| [45] | Patented | Nov. 30, 1971 |
| [73] | Assignee | Sylvania Electric Products Inc. |
| | | Original application Dec. 14, 1967, Ser. No. 690,513, now Patent No. 3,523,357, dated Dec. 14, 1967. Divided and this application Jan. 7, 1970, Ser. No. 1,261 |

[54] ELECTRICAL CONTACT MATERIAL AND METHOD OF MAKING AND UTILIZING THE SAME
2 Claims, 3 Drawing Figs.

[52] U.S. Cl. .................................................... 252/513, 75/0.5 BA
[51] Int. Cl. .................................................... H01b 1/02, C09c 1/62
[50] Field of Search ................................................ 75/0.5; 106/290; 252/512, 513

[56] References Cited
UNITED STATES PATENTS

| 3,484,284 | 12/1969 | Dates et al. ................... | 252/513 |
| 2,679,568 | 5/1954 | Smith et al. ................... | 252/513 |
| 3,403,043 | 9/1968 | Thompson ................... | 252/513 |

Primary Examiner—L. Dewayne Rutledge
Assistant Examiner—W. W. Stallard
Attorneys—Norman J. O'Malley, Donald R. Castle and William H. McNeill ABSTRACT: A composition of matter comprised of a powdered metal and a powdered glass formed by intimately mixing the two powdered materials together with a binder material, pressure forming into an article and sintering the article to its final form. The article is used ideally as an active electrical element and may be sealed to glass without any intermediate sealing material being utilized.

PATENTED NOV 30 1971 3,624,007

INVENTOR.
EDWARD MEYER

BY Donald R. Castle
ATTORNEY

ELECTRICAL CONTACT MATERIAL AND METHOD OF MAKING AND UTILIZING THE SAME

CROSS-REFERENCE TO RELATED APPLICATION

This application is a division of Ser. No. 690,513, filed Dec. 14, 1967, and now U. S. Pat. No. 3,523,357 and assigned to the assignee of the present invention.

BACKGROUND OF THE INVENTION

This invention relates to a composition of matter used to form active electrical contact elements for utilization in the manufacture of electron discharge devices. More particularly, it relates to powdered metal-powdered glass compositions which are used to form active electrical contact elements; e.g., second anode buttons in cathode ray tubes or leadin pins for many types of electrical devices. These elements are characterized by their ability to be sealed to glass or ceramic insulating materials without the benefit of any intermediate sealing compositions being utilized.

Providing hermetic seals between glass and metal has always been a problem in the electronics industry. Many solutions have been proposed, and many materials and special techniques have been developed to accomplish the desired result, with varying degrees of success. However, the known methods are deficient in many respects including the difficulty of controlling oxidation and reduction of some of the special metals utilized; the difficulty of temperature control; and the high cost of quality assurance programs required. Often, it is required to use an intermediate sealing agent, such as a glass frit or solder glass, to achieve a seal between a metal part and a glass substrate. Overcoming these deficiencies is a time-consuming and expensive procedure.

OBJECTS AND SUMMARY OF THE INVENTION

It is an object of the invention to reduce or eliminate the above-cited deficiencies.

It is another object of the invention to enhance glass-to-metal seals.

It is another object of the invention to provide a composition of matter ideally suited to glass-to-metal seals.

Still another object of the invention is to provide a method of making such a composition.

Yet another object of the invention is to enhance the manufacture of electrical devices.

These objects are accomplished, in one aspect of the invention, by the fabrication of an active electrical element from a powdered metal and a powdered glass, which element may be sealed in a vacuumtight manner to a glass without the intermediary of any special sealing compounds. The material and the processes involved are easily controllable and greatly enhance the sealing technology of glass-to-metal seals.

DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

Figure 1:
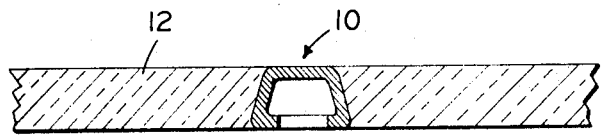
FIG. 1 is a diagrammatic sectional view of one form of the invention.
Figure 2:
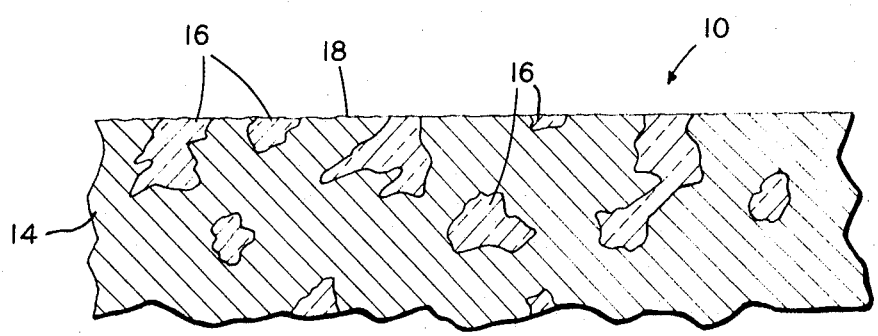
FIG. 2 is a much enlarged sectional view of a composition of matter made in accordance with the invention.
Figure 3:
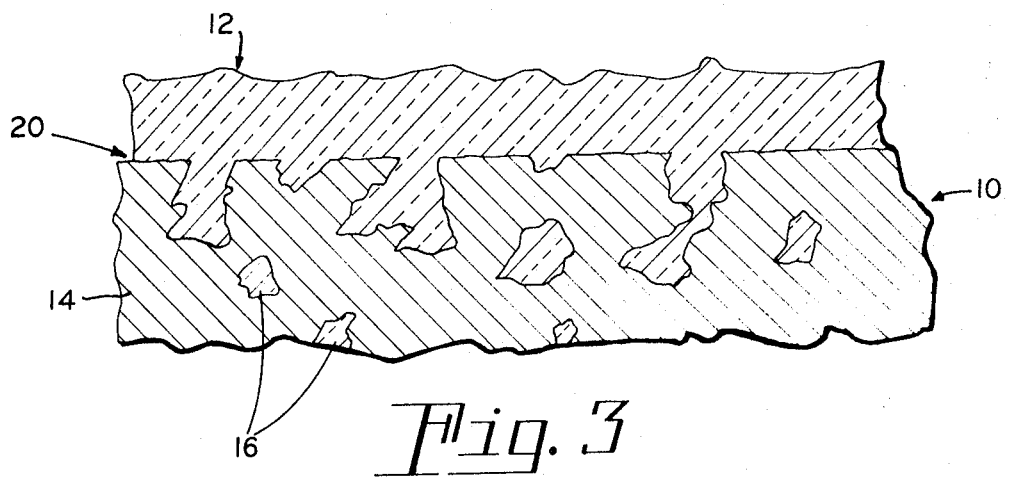
FIG. 3 is a much enlarged sectional view of a portion of a seal made in accordance with the invention.

In FIG. 1, there is shown an active electrical element 10, which in this instance is shown as being the second anode connection of a cathode ray tube. The element is hermetically sealed in a wall 12 of the tube. The enlarged diagrammatic view of FIG. 2 details in cross section the compositions of active element 10 showing the unique construction which permits sealing of the article to glass without the intermediary of any additional sealing material. The material shown comprises a substantially homogenous mixture of metal 14 and glass 16. Because of the homogeneous nature, the glass fills the voids between metal particles including some which exist immediately at the surface 18 thereof. Thus, when the sealing operation is performed by any of several well-known techniques, such, for example, as heating in an oven or by electrical induction, a sealed area 20 such as that illustrated in FIG. 3 is formed. From this figure, it will be seen that an actual fusion of the wall 12 at the surface 18 causes the glass thereat to combine with the glass pockets of element 10, thus forming a very strong hermetic seal.

Article 10 is formed from a composition of matter comprising a substantially homogeneous admixture of about 80 to 95 percent by weight of a powdered metal, with the remainder being a powdered borosilicate glass.

Specifically, the composition may comprise a powdered metal known as No. 4 alloy, which material is described in U.S. Pat. No. 2,284,151, and which comprises 42 percent nickel, 6 percent chromium, 0.1 percent aluminum, and the balance iron. A suitable powdered borosilicate glass is a composition comprised substantially of about 63 percent $SiO_2$, about 21 percent $B_2O_3$, and about 8 percent $Al_2O_3$.

A second composition may be formed from powdered Kovar, this material being described in U.S. Pat. No. 2,062,335 and comprising substantially 24 to 34 percent nickel, 5 to 25 percent cobalt, <1 percent manganese, and the balance iron. The powdered borosilicate glass to be mixed therewith is the same as that described above, such a glass being obtainable from the Corning Glass Works, Corning, New York, under the designation 7052.

The above compositions are fabricated in accordance with the following process. An admixture of a powdered metal and a powdered glass in a weight ratio of about 80 to 95 percent of said powdered metal and the remainder the powdered glass is formed by rolling together the two constituents, with the metal being of about −100 mesh and the powdered glass being of about −325 mesh, for about 6 to 8 hours, or some other time sufficient to insure a substantially homogeneous mixture. After this initial mix, a volatilizable binder material in an amount equal to about 1 to 3 percent by weight of said admixture is added, and the composition mixed again by rolling for an additional 2 to 4 hours. The admixture is then poured into a die, which, if the article to be formed is susceptible to dieforming in its final shape, may be so configured, and then compressed at a pressure of about 10,000 p.s.i. to green form the article. After pressure-forming, the article is sintered for about 3 hours in wet hydrogen at about 1350° C.

The article produced by this method has many advantages over those utilized by the prior art. It may be sealed to glass without the intermediary of any sealing compounds, since in cross section it will be like the article shown in FIG. 2; that is, by virtue of the homogeneous dispersion of the powdered glass particles throughout the metal matrix some of the glass will appear at the surface and will thus form the hermetic bond shown in FIG. 3. The composition has good mechanical strength and good electrical conductivity.

Sealing of the formed article to its glass substrate may be performed by known techniques such as heating in a furnace or induction heating. Presoftening of particular area of glass and insertion of the article may also be utilized in certain instances. An adequate heating system for many uses has been found to be furnace heating at 960° F. for 6 minutes. This system provides an extremely sound hermetic seal.

There has thus been provided by this invention a new composition of matter having considerable utilization as an active electrical element in an operable electrical device and which may be sealed therein without the intermediary of a sealing compound.

While there have been shown and described what are at present considered to be the preferred embodiments of the invention, it will be obvious to those skilled in the art that various changed and modifications may be made therein without departing from the scope of the invention as defined by the appended claims.

I claim:

1. A composition of matter consisting essentially of: a substantially homogeneous admixture of about 80 percent to 95 percent by weight of powdered metal, the remainder being a powdered glass, said powdered metal being selected from the group consisting of (1) a powdered metal consisting essentially of about 42 percent nickel, about 6 percent chromium, about 0.1 percent aluminum, and the remainder iron; and (2) a powdered metal consisting essentially of about 24 percent to 34 percent nickel, about 5 percent to 25 percent cobalt, less than 1 percent manganese and the remainder iron.

2. The composition of claim 1 wherein said powdered glass consists essentially of about 63 percent $SiO_2$, about 21 percent $B_2O_3$ and about 8 percent $Al_2O_3$.

* * * * *